US010691673B2

(12) United States Patent
Yan

(10) Patent No.: US 10,691,673 B2
(45) Date of Patent: Jun. 23, 2020

(54) ASSET MANAGEMENT SYSTEM, METHOD, APPARATUS, AND ELECTRONIC DEVICE

(71) Applicant: Alibaba Group Holding Limited, George Town (KY)

(72) Inventor: Xuebing Yan, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/275,868

(22) Filed: Feb. 14, 2019

(65) Prior Publication Data

US 2019/0251076 A1    Aug. 15, 2019

(30) Foreign Application Priority Data

Feb. 14, 2018  (CN) .......................... 2018 1 0151589

(51) Int. Cl.
*G06F 16/23* (2019.01)
*G06F 16/22* (2019.01)
(Continued)

(52) U.S. Cl.
CPC .......... *G06F 16/2365* (2019.01); *G06F 16/22* (2019.01); *G06F 16/27* (2019.01)

(58) Field of Classification Search
CPC ..... G06F 16/2365; G06Q 40/12; G06Q 40/04
See application file for complete search history.

(56) References Cited

U.S. PATENT DOCUMENTS 8,832,059 B2 * 9/2014 Baran ................ G06Q 30/0603
707/706
9,342,697 B1 * 5/2016 Ren ......................... G06F 21/60
(Continued)

FOREIGN PATENT DOCUMENTS

CN      106656974      5/2017
CN      106815764      6/2017
(Continued)

OTHER PUBLICATIONS

International Search Report and Written Opinion in International Application No. PCT/US2019/017946, dated May 7, 2019, 11 pages.
(Continued)

*Primary Examiner* — Phuong Thao Cao
(74) *Attorney, Agent, or Firm* — Fish & Richardson P.C.

(57) ABSTRACT

This specification describes techniques for managing assets in a blockchain. One example method includes receiving, from a target user recorded in a distributed database of a blockchain network, a user input including a request to perform a contract operation on asset objects including digital assets corresponding to physical assets associated with the target user, in response to receiving the request, generating an asset container as an operation target of the contract operation, the asset container recording field information of the asset objects, generating an asset container group by dividing the asset container into the asset container group based on an association relationship between the asset objects, wherein the association relationship defines correspondences between each asset container in the asset container group and at least one other asset container in the asset container group, and performing the contract operation on the asset container group using a contract object.

20 Claims, 16 Drawing Sheets

(51) Int. Cl.
  *G06Q 20/06* (2012.01)
  *G06Q 40/04* (2012.01)
  *G06Q 40/00* (2012.01)
  *G06F 16/27* (2019.01)

(56) References Cited

U.S. PATENT DOCUMENTS

| | | | |
|---|---|---|---|
| 10,102,082 B2* | 10/2018 | Cabrera | G06F 11/1464 |
| 10,204,349 B2* | 2/2019 | McCauley | G06Q 30/02 |
| 10,564,820 B1* | 2/2020 | Cabanero | G06F 3/01 |
| 2002/0109737 A1* | 8/2002 | Jaeger | G06F 3/0481 |
| | | | 715/863 |
| 2003/0233370 A1* | 12/2003 | Barabas | G06F 16/278 |
| 2008/0320024 A1 | 12/2008 | Thirumalai et al. | |
| 2014/0279942 A1* | 9/2014 | Siepmann | G06F 16/2365 |
| | | | 707/690 |
| 2015/0244690 A1 | 8/2015 | Mossbarger | |
| 2015/0262176 A1 | 9/2015 | Langschaedel et al. | |
| 2015/0379510 A1 | 12/2015 | Smith | |
| 2016/0012424 A1 | 1/2016 | Simon et al. | |
| 2016/0151715 A1* | 6/2016 | Polansky | A63F 13/792 |
| | | | 463/25 |
| 2016/0196324 A1* | 7/2016 | Haviv | G06F 16/122 |
| | | | 707/626 |
| 2016/0283920 A1 | 9/2016 | Fisher et al. | |
| 2016/0292672 A1 | 10/2016 | Fay et al. | |
| 2017/0005804 A1 | 1/2017 | Zinder | |
| 2017/0033932 A1 | 2/2017 | Truu et al. | |
| 2017/0048209 A1 | 2/2017 | Lohe et al. | |
| 2017/0048235 A1 | 2/2017 | Lohe et al. | |
| 2017/0103468 A1 | 4/2017 | Orsini et al. | |
| 2017/0116693 A1 | 4/2017 | Rae et al. | |
| 2017/0132630 A1 | 5/2017 | Castinado et al. | |
| 2017/0161733 A1 | 6/2017 | Koletsky et al. | |
| 2017/0221052 A1 | 8/2017 | Sheng et al. | |
| 2017/0232300 A1 | 8/2017 | Tran et al. | |
| 2017/0286880 A1 | 10/2017 | Wiig et al. | |
| 2017/0315882 A1* | 11/2017 | Yammine | G06F 16/11 |
| 2017/0344987 A1 | 11/2017 | Davis et al. | |
| 2017/0353309 A1 | 12/2017 | Gray | |
| 2018/0005186 A1* | 1/2018 | Hunn | G06F 40/103 |
| 2018/0018723 A1* | 1/2018 | Nagla | G06Q 20/4014 |
| 2018/0075527 A1* | 3/2018 | Nagla | G06F 21/64 |
| 2018/0089183 A1* | 3/2018 | Schwartz | G06F 16/2255 |
| 2018/0089256 A1 | 3/2018 | Wright, Sr. | |
| 2018/0089761 A1* | 3/2018 | Stradling | G06F 12/1408 |
| 2018/0091514 A1* | 3/2018 | Schwartz | G06F 16/438 |
| 2018/0167198 A1* | 6/2018 | Muller | G06F 21/16 |
| 2018/0253702 A1 | 9/2018 | Dowding | |
| 2018/0309567 A1 | 10/2018 | Wooden | |
| 2018/0329693 A1* | 11/2018 | Eksten | G06F 16/21 |
| 2018/0330342 A1 | 11/2018 | Prakash et al. | |
| 2019/0013948 A1* | 1/2019 | Mercuri | G06F 9/542 |
| 2019/0026821 A1 | 1/2019 | Bathen et al. | |
| 2019/0036906 A1* | 1/2019 | Biyani | H04L 63/20 |
| 2019/0080402 A1 | 3/2019 | Molinari et al. | |
| 2019/0122155 A1 | 4/2019 | Irazabal et al. | |
| 2019/0147431 A1 | 5/2019 | Galebach et al. | |
| 2019/0164153 A1 | 5/2019 | Agrawal et al. | |
| 2019/0172298 A1* | 6/2019 | Just | G07C 9/00309 |
| 2019/0222567 A1* | 7/2019 | Caldera | G06F 21/45 |
| 2019/0228386 A1 | 7/2019 | Onnainty | |
| 2019/0236598 A1* | 8/2019 | Padmanabhan | G06N 3/0454 |
| 2019/0236606 A1* | 8/2019 | Padmanabhan | G06Q 20/4014 |
| 2019/0238316 A1* | 8/2019 | Padmanabhan | H04L 9/0637 |
| 2019/0238525 A1* | 8/2019 | Padmanabhan | G06F 21/6245 |
| 2019/0251075 A1 | 8/2019 | Yan | |
| 2019/0251078 A1 | 8/2019 | Yan | |
| 2019/0251079 A1 | 8/2019 | Yan | |
| 2019/0251563 A1 | 8/2019 | Yan | |
| 2019/0253257 A1 | 8/2019 | Yan | |
| 2019/0303579 A1* | 10/2019 | Reddy | H04L 63/00 |
| 2019/0377806 A1* | 12/2019 | Padmanabhan | G06F 16/1834 |
| 2020/0034127 A1* | 1/2020 | Burrowes | G06F 8/60 |
| 2020/0037158 A1* | 1/2020 | Soundararajan | H04L 9/321 |
| 2020/0051176 A1* | 2/2020 | Liu | G06Q 30/0185 |

FOREIGN PATENT DOCUMENTS

| | | |
|---|---|---|
| CN | 106845960 | 6/2017 |
| CN | 106874087 | 6/2017 |
| CN | 107145768 | 9/2017 |
| CN | 107220820 | 9/2017 |
| CN | 107239940 | 10/2017 |
| CN | 107273759 | 10/2017 |
| CN | 107301536 | 10/2017 |
| CN | 107615317 | 1/2018 |
| TW | M543413 | 6/2017 |
| TW | 201732666 | 9/2017 |
| TW | 201732705 | 9/2017 |
| TW | 201732706 | 9/2017 |
| TW | 201741955 | 12/2017 |
| TW | 201800997 | 1/2018 |
| TW | M555500 | 2/2018 |
| WO | WO 2017091530 | 6/2017 |
| WO | WO 2017190175 | 11/2017 |
| WO | WO 2017223470 | 12/2017 |

OTHER PUBLICATIONS

International Search Report and Written Opinion in International Application No. PCT/US2019/017951, dated May 14, 2019, 7 pages.
International Search Report and Written Opinion in International Application No. PCT/US2019/017956, dated May 14, 2019, 7 pages.
International Search Report and Written Opinion in International Application No. PCT/US2019/017958, dated May 1, 2019, 8 pages.
International Search Report and Written Opinion in International Application No. PCT/US2019/017980, dated May 2, 2019, 9 pages.
International Search Report and Written Opinion in International Application No. PCT/US2019/017986, dated May 1, 2019, 9 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
Chen et al., "Blockchain-based Payment Collection Supervision System using Pervasive Bitcoin Digital Wallet," Fifth International Workshop on Pervasive and Contect-Aware Middleware, Oct. 2017, 8 pages.
binance.vision [online], "Proof of Burn Explained", Binance Academy, 2017, retrieved on Feb. 23, 2020, retrieved from URL <https://www.binance.vision/ja/blockchain/proof-of-burn-explained>, 7 pages (with partial English translation).

* cited by examiner

ASSET MANAGEMENT SYSTEM, METHOD, APPARATUS, AND ELECTRONIC DEVICE

CROSS-REFERENCE TO RELATED APPLICATIONS

This application claims priority to Chinese Patent Application No. 201810151589.3, filed on Feb. 14, 2018, which is hereby incorporated by reference in its entirety.

TECHNICAL FIELD

One or more implementations of the present specification relate to the field of terminal technologies, and in particular, to an asset management system, method, apparatus, and an electronic device.

BACKGROUND

In related technologies, any asset such as funds, bills, debts, real estate, and services owned by users (e.g., persons or enterprises) can be securitized, so that the assets can be converted into an asset object in a blockchain network, to improve asset liquidity.

When there are many asset objects, a separate single operation for each asset object may not satisfy the user's efficiency demands.

SUMMARY

In view of this, one or more implementations of the present specification provide an asset management system, method, apparatus, and an electronic device.

To achieve the previous objective, the one or more implementations of the present specification provide the following technical solutions:

According to a first aspect of the one or more implementations of the present specification, an asset management system is provided, including: a blockchain node in a blockchain network; and asset containers located at the blockchain node, where the asset containers are configured to record field information of asset objects registered on a blockchain ledger, the asset containers form at least one asset container group, and an association relationship exists between each asset container in the asset container group and at least one another asset container in the asset container group.

According to a second aspect of the one or more implementations of the present specification, an asset management method is provided, including: creating, by a blockchain node in a blockchain network, an asset container, to record field information of an asset object registered on a blockchain ledger; and dividing, by the blockchain node, corresponding asset containers into at least one asset container group based on an association relationship between asset objects, where an association relationship exists between each asset container in the asset container group and at least one another asset container in the asset container group.

According to a third aspect of the one or more implementations of the present specification, an asset management apparatus is provided, including: a creation unit, configured to enable a blockchain node in a blockchain network to create an asset container, to record field information of an asset object registered on a blockchain ledger; and a dividing unit, configured to enable the blockchain node to divide corresponding asset containers into at least one asset container group based on an association relationship between asset objects, where an association relationship exists between each asset container in the asset container group and at least one another asset container in the asset container group.

According to a fourth aspect of the one or more implementations of the present specification, an electronic device is provided, including: a processor; and a memory, configured to store an instruction that can be executed by the processor, where the processor is configured to implement the asset management method according to any one of the previous implementations.

DESCRIPTION OF IMPLEMENTATIONS

Example implementations are described in detail here, and examples of the example implementations are presented in the accompanying drawings. When the following description relates to the accompanying drawings, unless specified otherwise, the same numbers in different accompanying drawings represent the same or similar elements. Implementations described in the following example implementations do not represent all implementations consistent with one or more implementations of the present specification. On the contrary, the implementations are examples of apparatuses and methods that are described in the appended claims in detail and consistent with some aspects of the one or more implementations of the present specification.

It is worthwhile to note that in other implementations, steps of the corresponding method are not necessarily performed based on the sequence shown and described in the present specification. In some other implementations, the method can include more steps than steps described in the present specification. In addition, a single step described in the present specification may be divided into a plurality of steps in other implementations for description, and a plurality of steps described in the present specification may be combined into a single step in other implementations for description.

Figure 1:
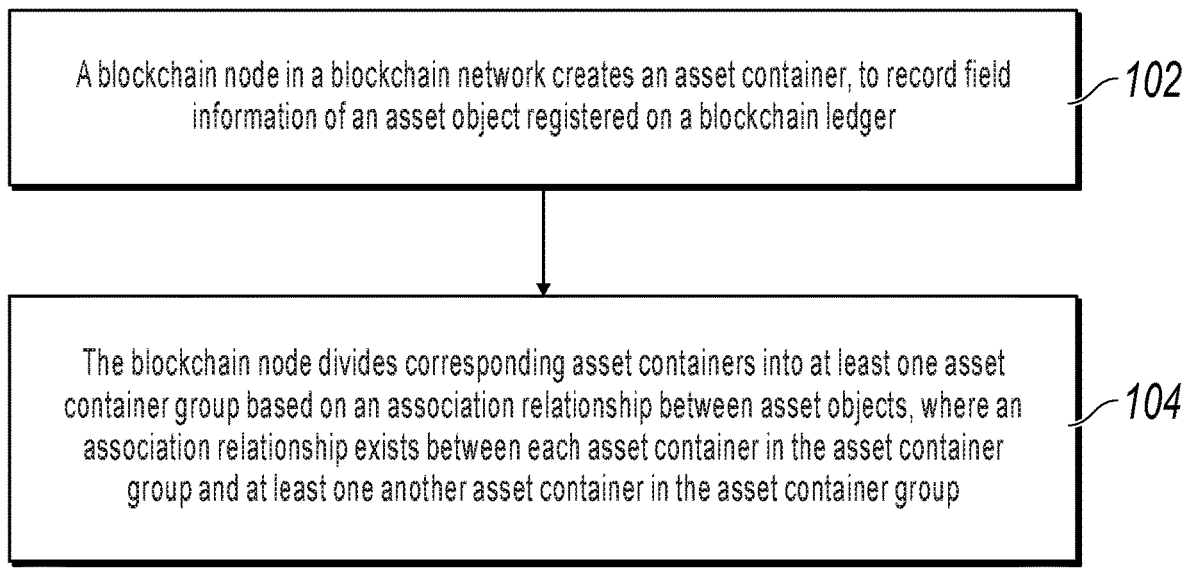
FIG. 1 is a flowchart illustrating an asset management method, according to an example implementation.

FIG. 1 is a flowchart illustrating an asset management method, according to an example implementation. As shown in FIG. 1, the method can include the following steps.

Step 102: A blockchain node in a blockchain network creates an asset container, to record field information of an asset object registered on a blockchain ledger.

In an implementation, the blockchain ledger is used to record all information generated in the blockchain network. Specifically, distributed ledger technology is used in the blockchain, each blockchain node stores full accounting information, and all blockchain nodes can reach consensus in terms of accounting information by using a consensus algorithm. Therefore, it can be considered that all the blockchain nodes jointly maintain a uniform ledger, namely, a blockchain ledger.

In an implementation, the blockchain network can support a plurality of types of objects, such as an account object, and a contract object. The account object is used to implement account management and related operations, and the contract object is used to implement contract management and related operations. Further, the blockchain network in the present specification can support a plurality of types of assets. Therefore, the blockchain network in the present specification can support an asset object, to maintain and manage a corresponding type of asset by using the asset object.

In an implementation, the asset object can include a smart asset object. The smart asset object is created for a smart asset. The smart asset corresponds to any type of asset of users such as funds, real estate, stocks, loan contracts, bills, and accounts receivable in a real world or offline scenario. The smart asset object enables the smart asset to be processed in the block chain, for example, the smart asset is particularly suitable for processing the smart asset object by using a smart contract in the block chain.

In an implementation, the blockchain node creates an asset container, so that field information of an asset object can be recorded in the asset container. Therefore, the corresponding asset object is maintained based on the asset container. For example, the asset container can include a data table of a predetermined structure, etc. Implementations are not limited in the present specification.

In an implementation, the blockchain node can create a contract operation based on a contract object corresponding to a specified type of asset by invoking an asset described in the contract object, to create an asset object satisfying the specified type. In another implementation, the blockchain node can further create a contract object in other ways. Implementations are not limited in the present specification.

104. The blockchain node divides corresponding asset containers into at least one asset container group based on an association relationship between asset objects, where an association relationship exists between each asset container in the asset container group and at least one another asset container in the asset container group.

In an implementation, unified maintenance can be performed on a plurality of associated asset containers in the asset container group based on an association relationship between asset containers in the asset container group, to implement batch management of corresponding asset objects. Therefore, there is no need to perform separate management on each asset object, so that asset object management efficiency of the blockchain network can be improved.

In an implementation, the blockchain node can initiate an operation instruction for the first asset container in the asset container group. Correspondingly, when there is the second asset container associated with the first asset container in the asset container group, both the first asset container and the second asset container are added as operation targets of the operation instruction. The blockchain node can initiate the operation instruction for the first asset container, and there is no request to separately initiate the operation instruction for the first asset container and the second asset container. Particularly, there may be a large quantity of second asset containers in the asset container group. Based on the previous implementation, a large quantity of operations such as selecting the second asset container and sending the operation instruction can be omitted, and corresponding operation processing can be rapidly and accurately performed for the first asset container and all the second asset containers.

In an implementation, the blockchain node initiates an operation instruction for the first asset container in the asset container group. Correspondingly, after the operation instruction is executed for the first asset container, the second asset container and the first asset container keep an original association relationship. For example, when the operation instruction is an asset object transfer instruction, the blockchain node only requests to transfer the first asset container to a target object (e.g., an account object, a contract object, or an asset object) by using the asset object transfer instruction, and it can be considered that the second asset container is also transferred to the target object based on the association relationship between the second asset container and the first asset container. Therefore, there is no request to separately initiate the asset object transfer instruction for the first asset container and the second asset container. Particularly, the asset container group may include a large quantity of second asset containers. Based on the previous implementation, a large quantity of operations such as selecting the second asset container and sending the operation instruction can be omitted, and corresponding operation processing can be rapidly and accurately performed for the first asset container and all the second asset containers.

In an implementation, the previous operation instruction can include any type of instruction, for example, the previous asset object transfer instruction that is used to transfer an asset object, or an asset object transaction instruction that is used for asset object transaction. Implementations are not limited in the present specification.

In an implementation, the blockchain node can initiate the previous operation instruction in any way. Implementations are not limited in the present specification. For example, the blockchain node can initiate a contract operation for the first asset container, so that corresponding operation processing can be performed on the first asset container and the second asset container. The contract operation can be written to a corresponding contract object in advance. If the blockchain node has an invoking permission for the contract operation, the previous operation instruction can be initiated based on the contract operation.

In an implementation, the association relationship between asset containers can be in a plurality of forms. Implementations are not limited in the present specification. For example, there can be a binding relationship between a plurality of asset containers. When the blockchain node initiates an operation instruction for any one of the plurality of asset containers, the asset container can be used as the first asset container in the previous implementation, and remaining asset containers in the plurality of asset containers can be used as the second asset containers, to implement processing operations in the previous implementation. For another example, there can be a homing relationship of a hierarchical structure between a plurality of asset containers. When there is an association relationship between the first asset container and the second asset container, it can be considered that the lower-level second asset container belongs to the higher-level first asset container. For example, the second asset container can include all direct descendant asset containers of the first asset container in a corresponding asset container group. For example, if asset container A1 is the first asset container, both asset containers B1 and B2 are child asset containers of asset container A1, and asset container C is a child asset container of asset container B1, asset containers B1 and B2 and asset container C are direct descendant asset containers of asset container A1 and are the previously described second asset containers. If asset container A1 and asset container A2 are child asset containers of asset container X, and asset container B3 is a child asset container of asset container A2, asset container B3 is not a direct descendant asset container of asset container A1 and is not the previously described second asset container.

In an implementation, because an object that an asset object belongs to is determined, for an asset container in the blockchain network, each parent asset container can have one or more child asset containers, but each child asset container belongs to only one parent asset container.

In an implementation, when the second asset container is an asset container associated with the first asset container in the asset container group, indication information of the second asset container is recorded in the first asset container, so that an association relationship between the first asset container and the second asset container is determined based on the indication information. For example, the indication information can include an address of the second asset container. The indication information can be added to a predetermined field of an asset object that is recorded in the first asset container, so that the indication information can be read from the predetermined field in the first asset container when an operation instruction is initiated for the first asset container and corresponding processing operations is performed for the first asset container, to determine the associated second asset container. In some implementation, the association relationship between the first asset container and the second asset container can be recorded in other ways. Implementations are not limited in the present specification. For example, the blockchain node can create a relationship container, and association relationship information of asset containers is recorded in the relationship container.

Figure 2:
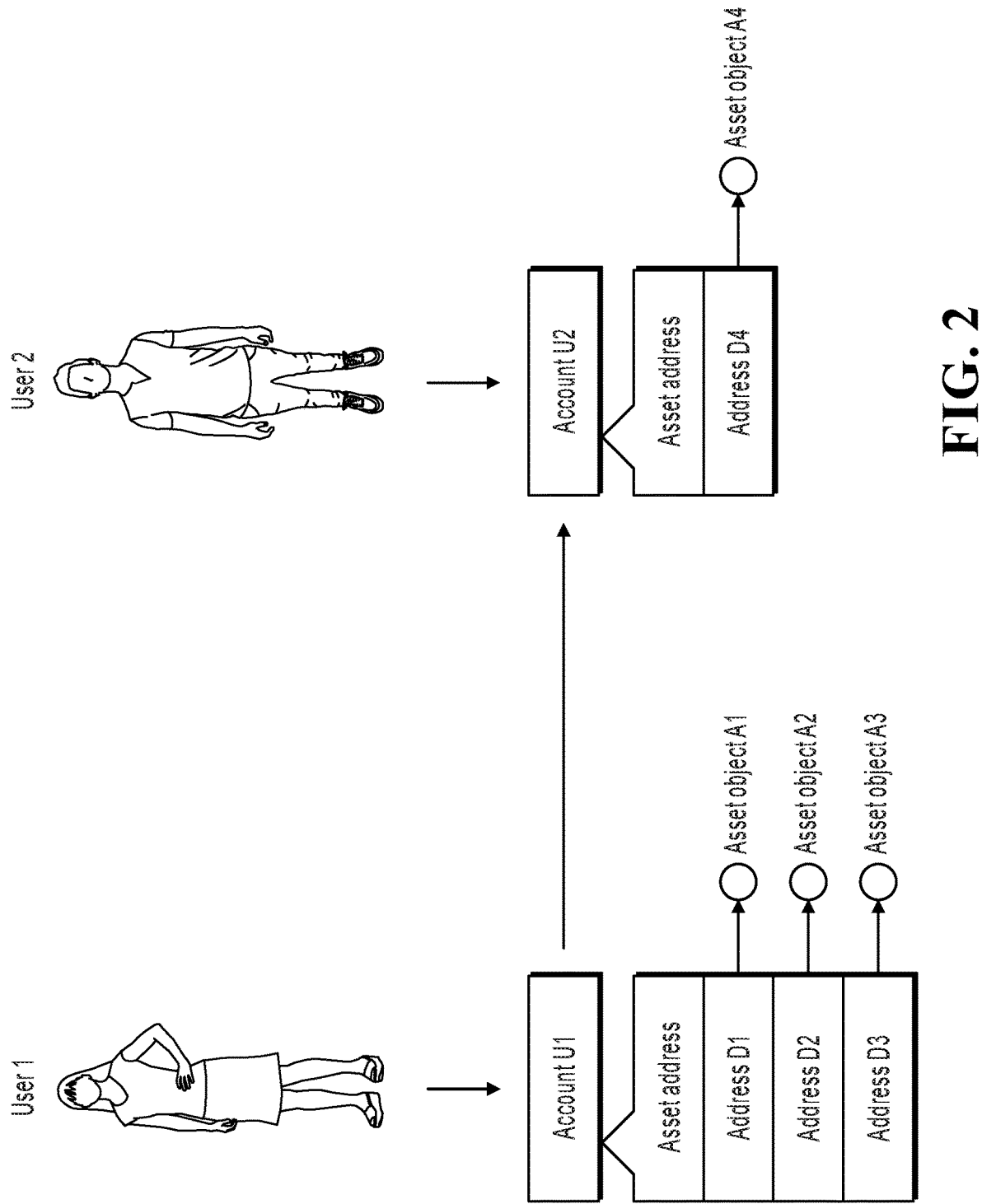
FIG. 2 is a schematic diagram illustrating an asset transfer scenario, according to an example implementation.

For ease of understanding, the following describes the technical solutions of the one or more implementations of the present specification by using an "asset transfer" process as an example. FIG. 2 is a schematic diagram illustrating an asset transfer scenario, according to an example implementation. As shown in FIG. 2, assume that user 1 registers account U1 at a blockchain network, and user 2 registers account U2 at the blockchain network. An asset address field of account U1 includes address D1 corresponding to asset object A1, address D2 corresponding to asset object A2, and address D3 corresponding to asset object A3. It indicates that asset object A1, asset object A2, and asset object A3 belong to account U1. An asset address field of account U2 includes address D4 corresponding to asset object A4. It indicates that asset object A4 belongs to account U2. When user 1 wants to transfer asset object A1, asset object A2, and asset object A3 corresponding to account U1 to account U2, quick asset transfer can be implemented by using the asset management solution of the present specification.

It is worthwhile to note that a blockchain node in the blockchain network respectively creates asset containers corresponding to asset objects A1 to A4, to record field information such as asset address fields, storage information fields, contract content fields, and anti-replay attack count fields of asset objects A1 to A4. In terms of function and processing logic, it can still be considered that implementation is performed based on an asset object. Therefore, for ease of understanding, the following performs description by using "asset object" instead of a corresponding asset container.

Figure 3:
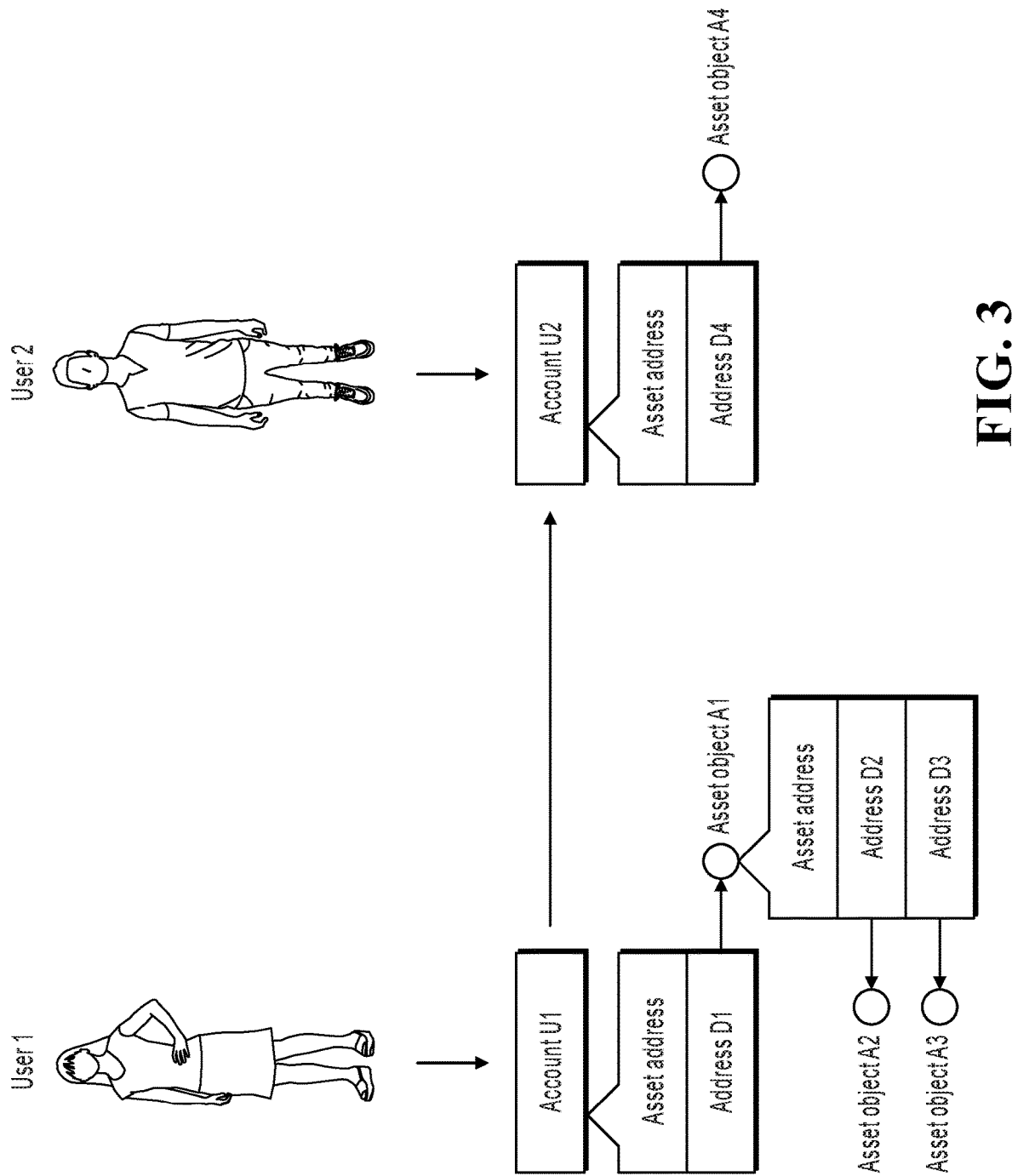
FIG. 3 is a schematic diagram illustrating establishing an association relationship between asset objects, according to a first example implementation.

FIG. 3 is a schematic diagram illustrating establishing an association relationship between asset objects, according to a first example implementation. As shown in FIG. 3, a blockchain node in a blockchain network can configure asset object A2 and asset object A3 as asset objects belonging to asset object A1, to establish an association relationship of a hierarchical structure between asset objects A1 to A3. Asset object A1 is used as a parent asset object (corresponding to a parent asset container), and asset objects A2 and A3 are used as child asset objects (corresponding to child asset containers). Specifically, the blockchain node can write address D2 of asset object A2 to an asset address field of asset object A1, so that asset object A2 is configured as a child asset object belonging to asset object A1. Similarly, the blockchain node can write address D3 of asset object A3 to the asset address field of asset object A1, so that asset object A3 is configured as a child asset object belonging to asset object A1. In this case, it can be understood that ownership of asset object A1 directly belongs to account U1, and because ownership of asset objects A2 and A3 belongs to asset object A1, the ownership of asset objects A2 and A3 indirectly belongs to account U1.

Figure 4:
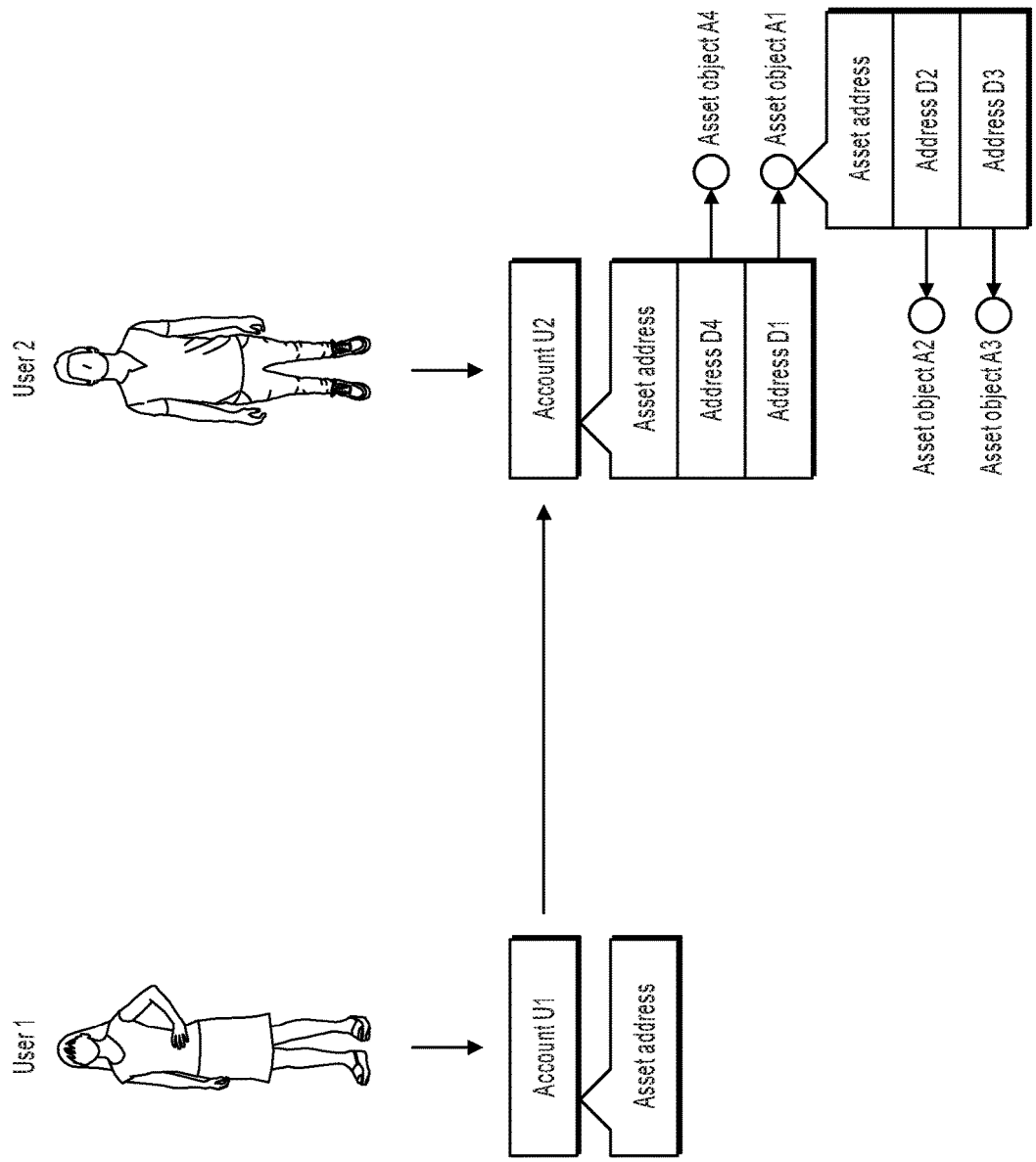
FIG. 4 is a schematic diagram illustrating transferred asset objects, according to a first example implementation.

Therefore, an asset object transfer instruction only requests to be sent for asset object A1, and asset object A1 is transferred to account U2. Then, asset objects A2 and A3 are automatically transferred based on an association relationship between asset object A1 and asset objects A2 and A3. For example, FIG. 4 is a schematic diagram illustrating transferred asset objects, according to a first example implementation. As shown in FIG. 4, an asset object transfer instruction is initiated for asset object A1, address D1 can be deleted from an asset address field of account U1, and address D1 is added to an asset address field of account U2, to transfer ownership of asset object A1 from account U1 to account U2. In this case, because ownership of asset objects A2 and A3 belongs to asset object A1, the ownership of asset objects A2 and A3 indirectly belongs to account U2, and the ownership of asset objects A2 and A3 is automatically transferred based on an association relationship between asset object A1 and asset objects A2 and A3 without separately initiating the corresponding asset object transfer instruction for asset object A2 and asset object A3.

Figure 5:
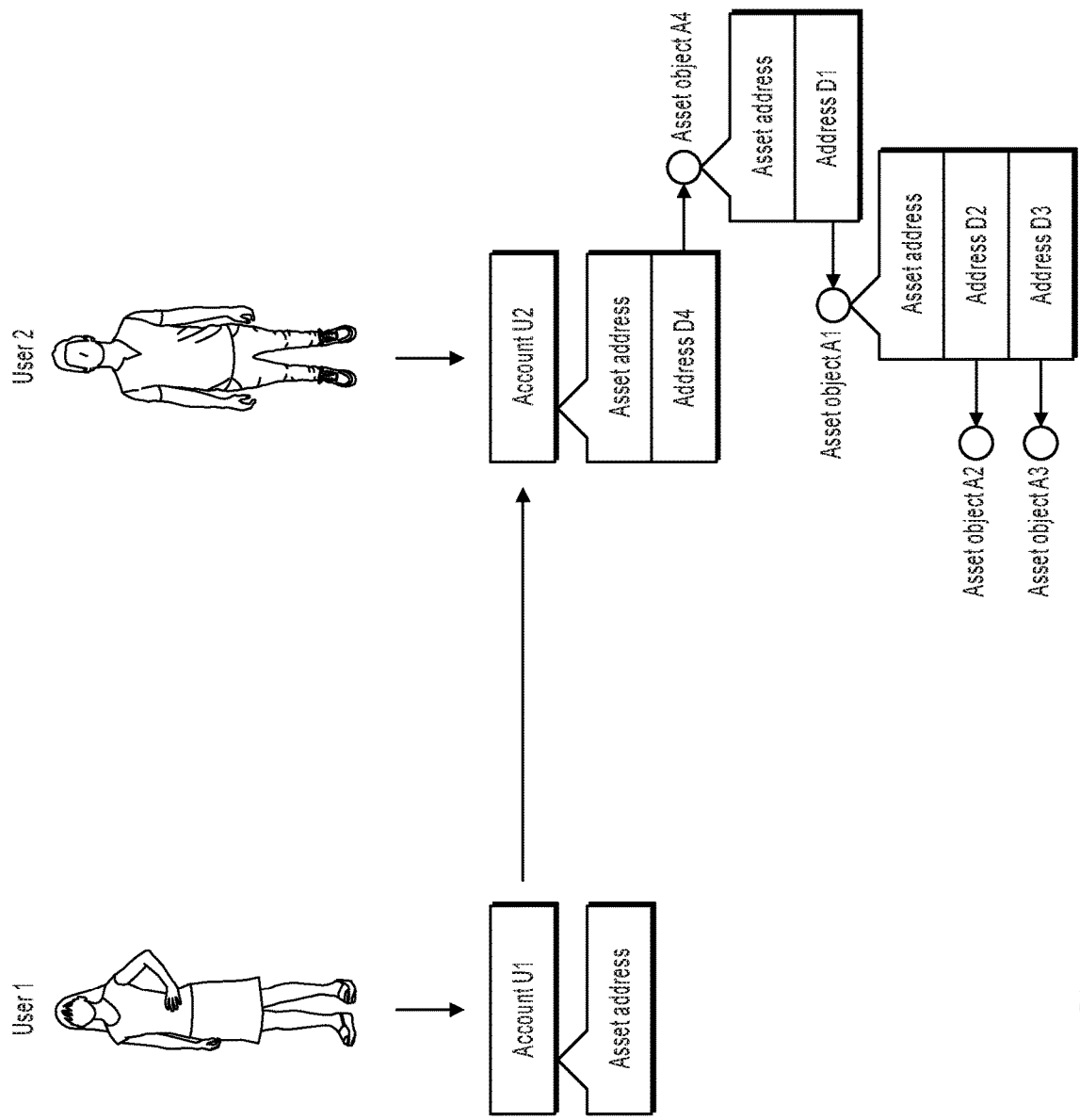
FIG. 5 is another schematic diagram illustrating transferred asset objects, according to a first example implementation.

For another example, FIG. 5 is another schematic diagram illustrating transferred asset objects, according to a first example implementation. As shown in FIG. 5, an asset object transfer instruction is initiated for asset object A1, address D1 can be deleted from an asset address field of account U1, and address D1 is added to an asset address field of asset object A4. Because ownership of asset object A4 belongs to account U2, ownership of asset object A1 is transferred from account U1 to account U2. In this case, because ownership of asset objects A2 and A3 belongs to asset object A1, the ownership of asset objects A2 and A3 indirectly belongs to account U2, and the ownership of asset objects A2 and A3 is automatically transferred based on an association relationship between asset object A1 and asset objects A2 and A3 without separately initiating the corresponding asset object transfer instruction for asset object A2 and asset object A3.

Figure 6:
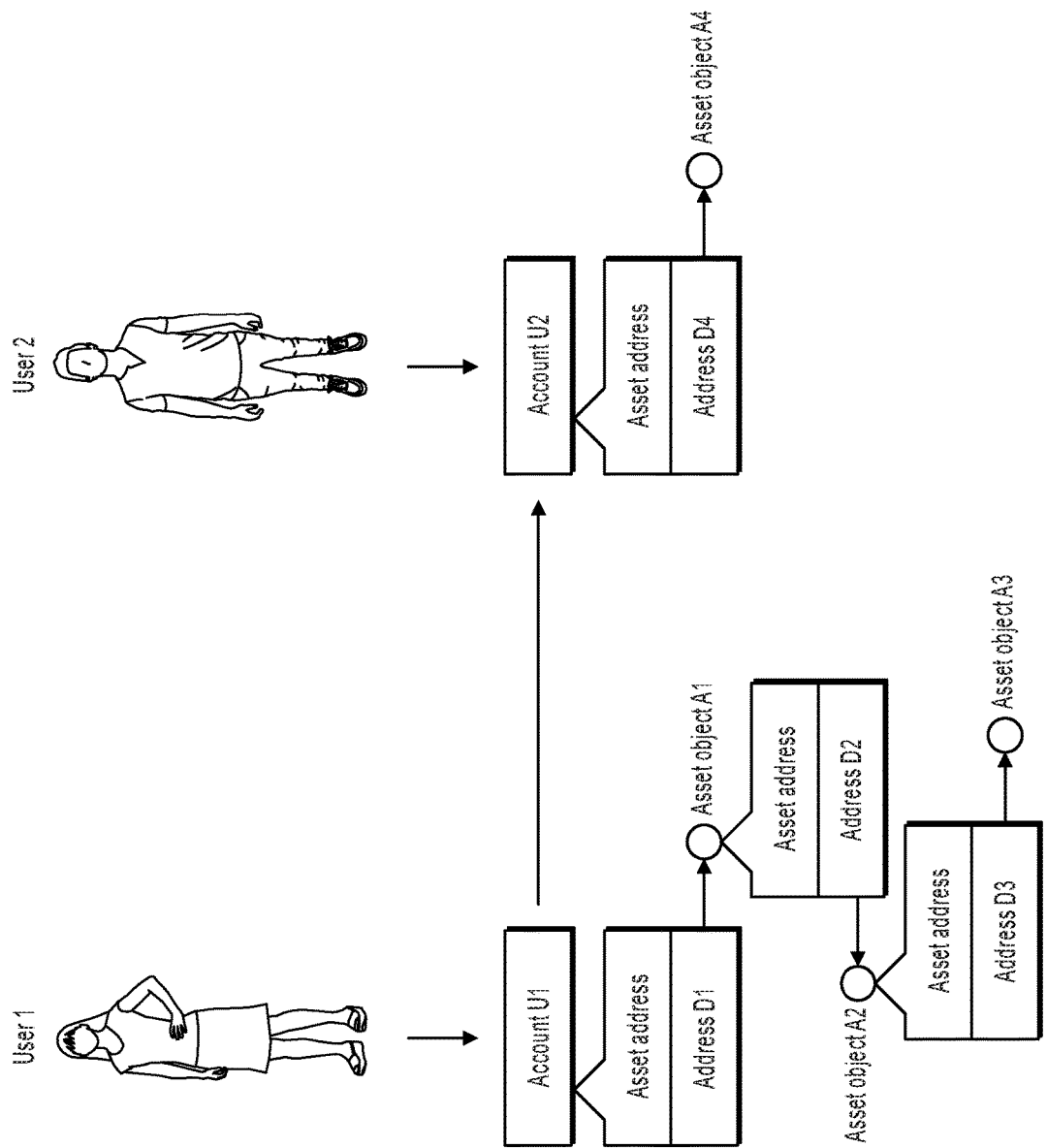
FIG. 6 is a schematic diagram illustrating establishing an association relationship between asset objects, according to a second example implementation.

In addition to the association relationship shown in FIG. 3, other forms of association relationship can be established for asset objects A1 to A3. Implementations are not limited in the present specification. For example, FIG. 6 is a schematic diagram illustrating establishing an association relationship between asset objects, according to a second example implementation. As shown in FIG. 6, a blockchain node can write address D2 of asset object A2 to an asset address field of asset object A1, so that asset object A2 is configured as a child asset object belonging to asset object A1. Similarly, the blockchain node can write address D3 of asset object A3 to an asset address field of asset object A2, so that asset object A3 is configured as a child asset object belonging to asset object A2. In this case, it can be understood that ownership of asset object A1 directly belongs to account U1, and because ownership of asset object A2 belongs to asset object A1, and ownership of asset object A3 belongs to asset object A2, ownership of asset objects A2 and A3 indirectly belongs to account U1.

Figure 7:
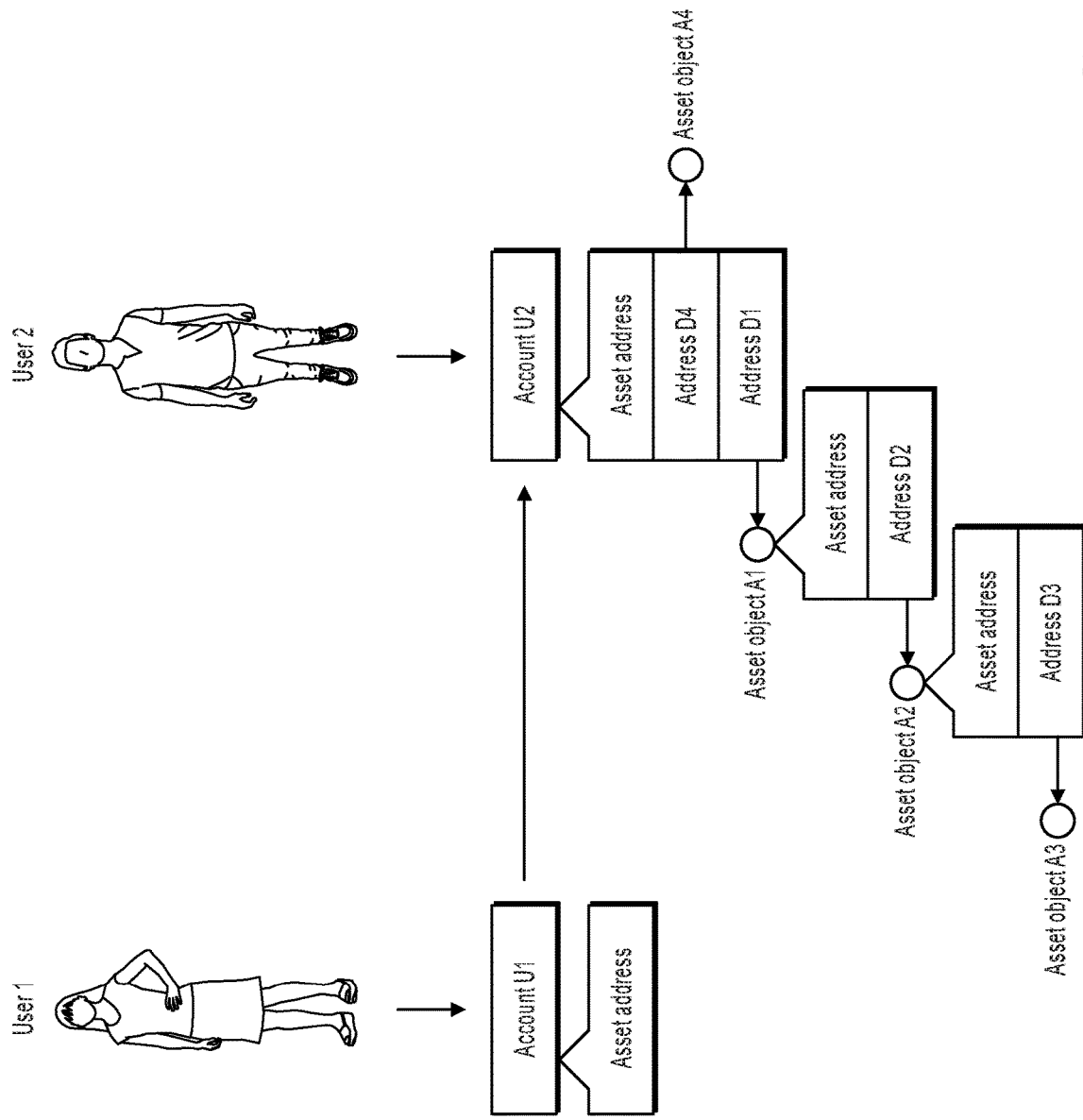
FIG. 7 is a schematic diagram illustrating transferred asset objects, according to a second example implementation.

Therefore, an asset object transfer instruction only requests to be sent for asset object A1, and asset object A1 is transferred to account U2. Then, asset objects A2 and A3 are automatically transferred based on an association relationship between asset object A1 and asset objects A2 and A3. For example, similar to the implementation shown in FIG. 4, FIG. 7 is a schematic diagram illustrating transferred asset objects, according to a second example implementation. As shown in FIG. 7, an asset object transfer instruction is initiated for asset object A1, address D1 can be deleted from an asset address field of account U1, and address D1 is added to an asset address field of account U2, to transfer ownership of asset object A1 from account U1 to account U2. In this case, because ownership of asset objects A2 belongs to asset object A1, and ownership of asset object A3 belongs to asset object A2, ownership of asset objects A2 and A3 indirectly belongs to account U2, and the ownership of asset objects A2 and A3 is automatically transferred based on an association relationship between asset object A1 and asset objects A2 and A3 without separately initiating the corresponding asset object transfer instruction for asset object A2 and asset object A3.

Figure 8:
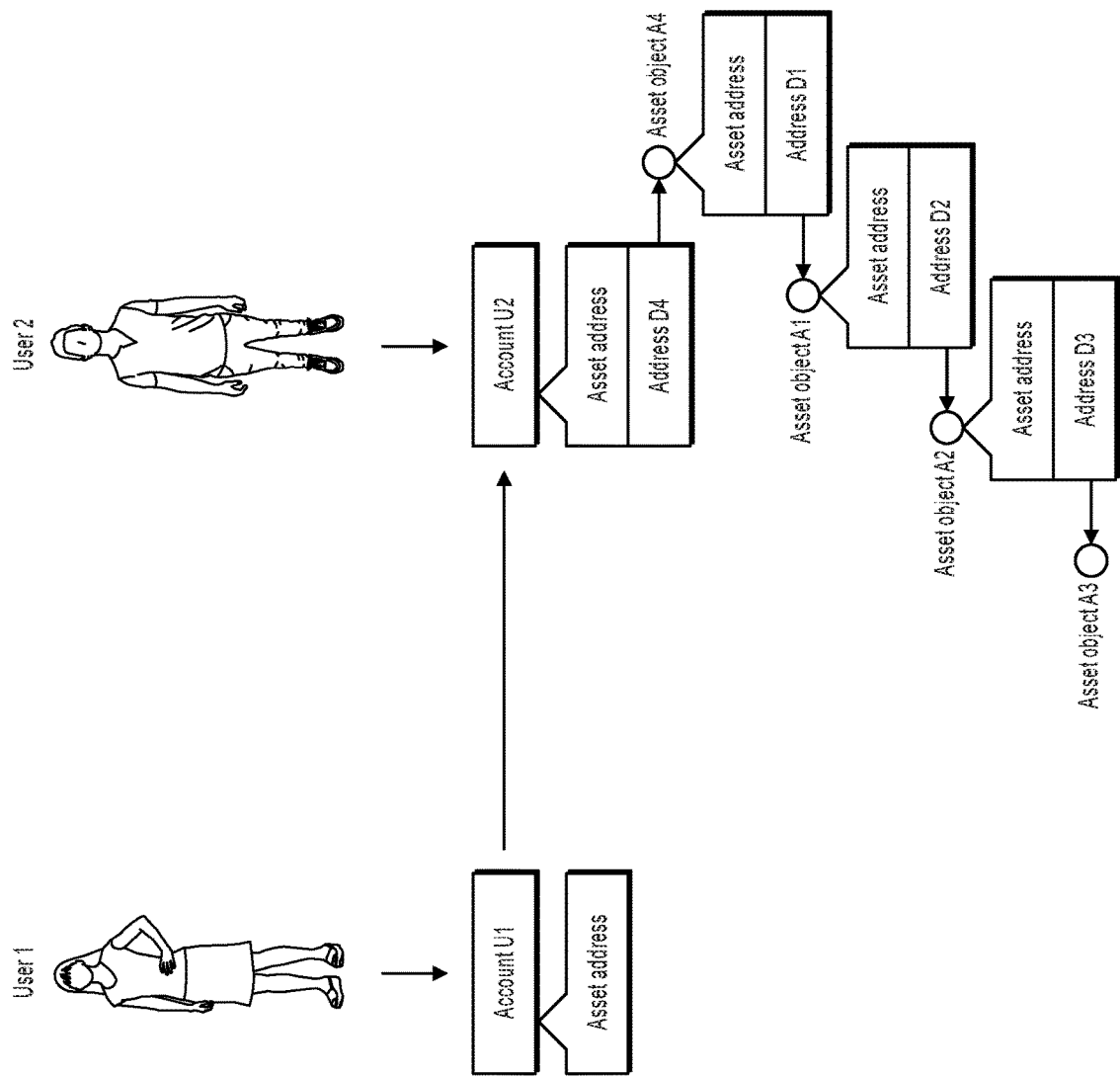
FIG. 8 is another schematic diagram illustrating transferred asset objects, according to a second example implementation.

For another example, similar to the implementation shown in FIG. 5, FIG. 8 is another schematic diagram illustrating transferred asset objects, according to a second example implementation. As shown in FIG. 8, an asset object transfer instruction is initiated for asset object A1, address D1 can be deleted from an asset address field of account U1, and address D1 is added to an asset address field of asset object A4. Because ownership of asset object A4 belongs to account U2, ownership of asset object A1 is transferred from account U1 to account U2. In this case, because ownership of asset objects A2 belongs to asset object A1, and ownership of asset object A3 belongs to asset object A2, ownership of asset objects A2 and A3 indirectly belongs to account U2, and the ownership of asset objects A2 and A3 is automatically transferred based on an association relationship between asset object A1 and asset objects A2 and A3 without separately initiating the corresponding asset object transfer instruction for asset object A2 and asset object A3.

Figure 9:
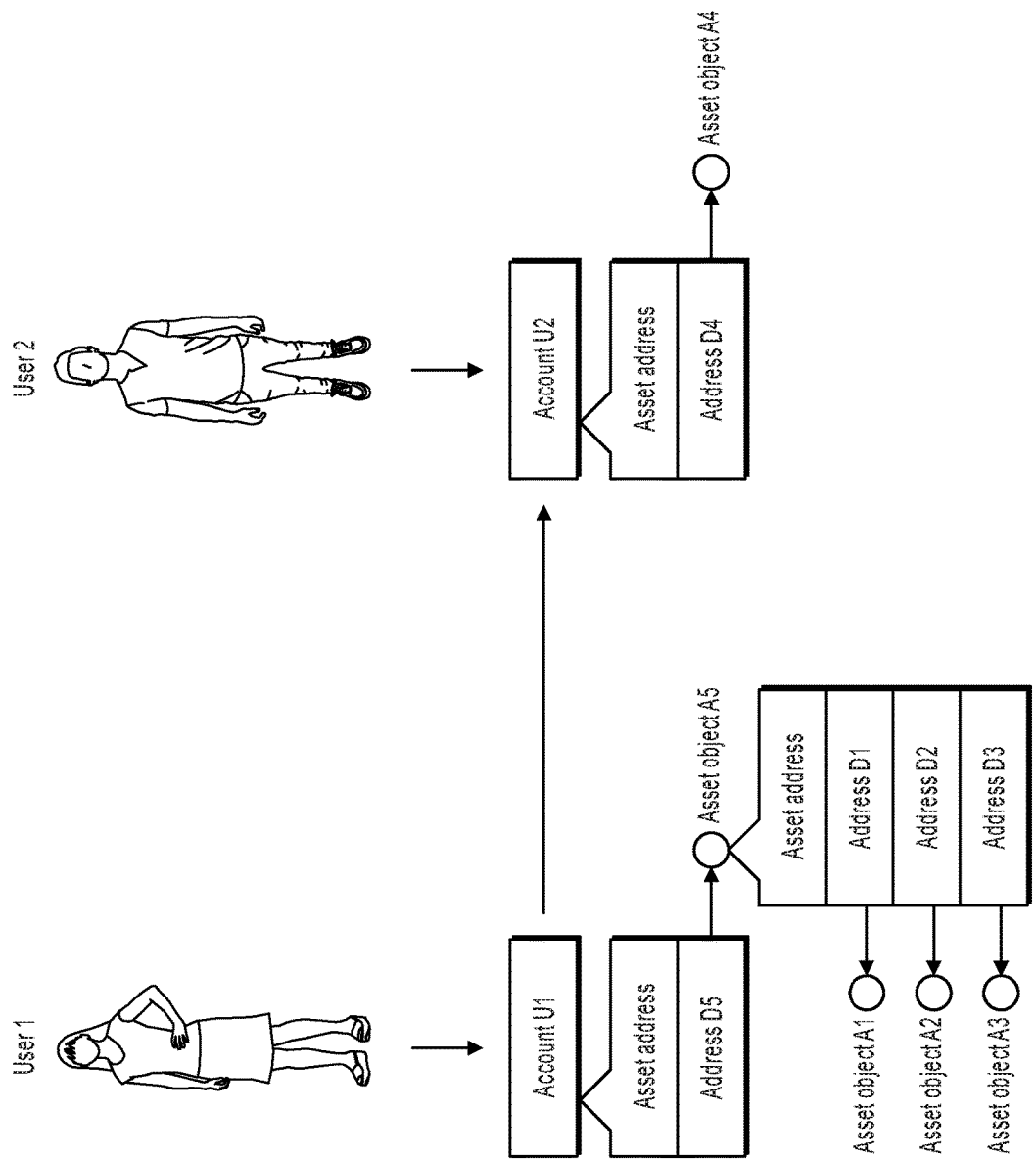
FIG. 9 is a schematic diagram illustrating establishing an association relationship between asset objects, according to a third example implementation.

FIG. 9 is a schematic diagram illustrating establishing an association relationship between asset objects, according to a third example implementation. As shown in FIG. 9, a blockchain node can create new asset object A5, write address D5 of asset object A5 to an asset address field of account U1, and write addresses D1 to D3 of asset object A1 to A3 to an asset address field of asset object A5, so that asset objects A1 to A3 are configured as child asset objects belonging to asset object A5. In this case, it can be understood that ownership of asset object A5 directly belongs to account U1, and because ownership of asset objects A1 to A3 belongs to asset object A5, the ownership of asset objects A1 to A3 indirectly belongs to account U1.

Figure 10:
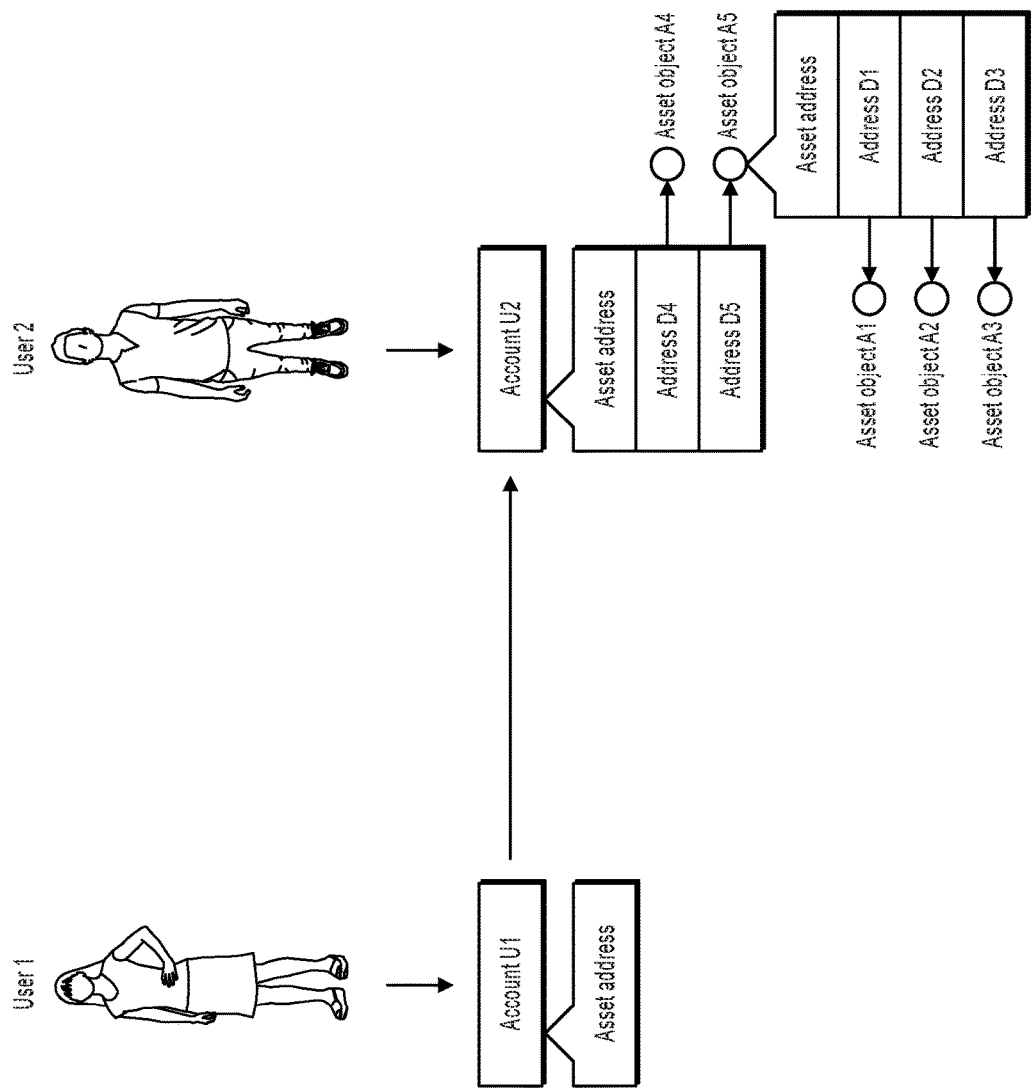
FIG. 10 is a schematic diagram illustrating transferred asset objects, according to a third example implementation.

Therefore, an asset object transfer instruction only requests to be sent for asset object A5, and asset object A5 is transferred to account U2. Then, asset objects A1 to A3 are automatically transferred based on an association relationship between asset object A5 and asset objects A1 to A3. For example, similar to the implementations shown in FIG. 4 and FIG. 7, FIG. 10 is a schematic diagram illustrating transferred asset objects, according to a third example implementation. As shown in FIG. 10, an asset object transfer instruction is initiated for asset object A5, address D5 can be deleted from an asset address field of account U1, and address D5 is added to an asset address field of account U2, to transfer ownership of asset object A5 from account U1 to account U2. In this case, because ownership of asset objects A1 to A3 belongs to asset object A5, the ownership of asset objects A1 to A3 indirectly belongs to account U2, and the ownership of asset objects A1 to A3 is automatically transferred based on an association relationship between asset object A5 and asset objects A1 to A3 without separately initiating the corresponding asset object transfer instruction for asset objects A1 to A3.

Figure 11:
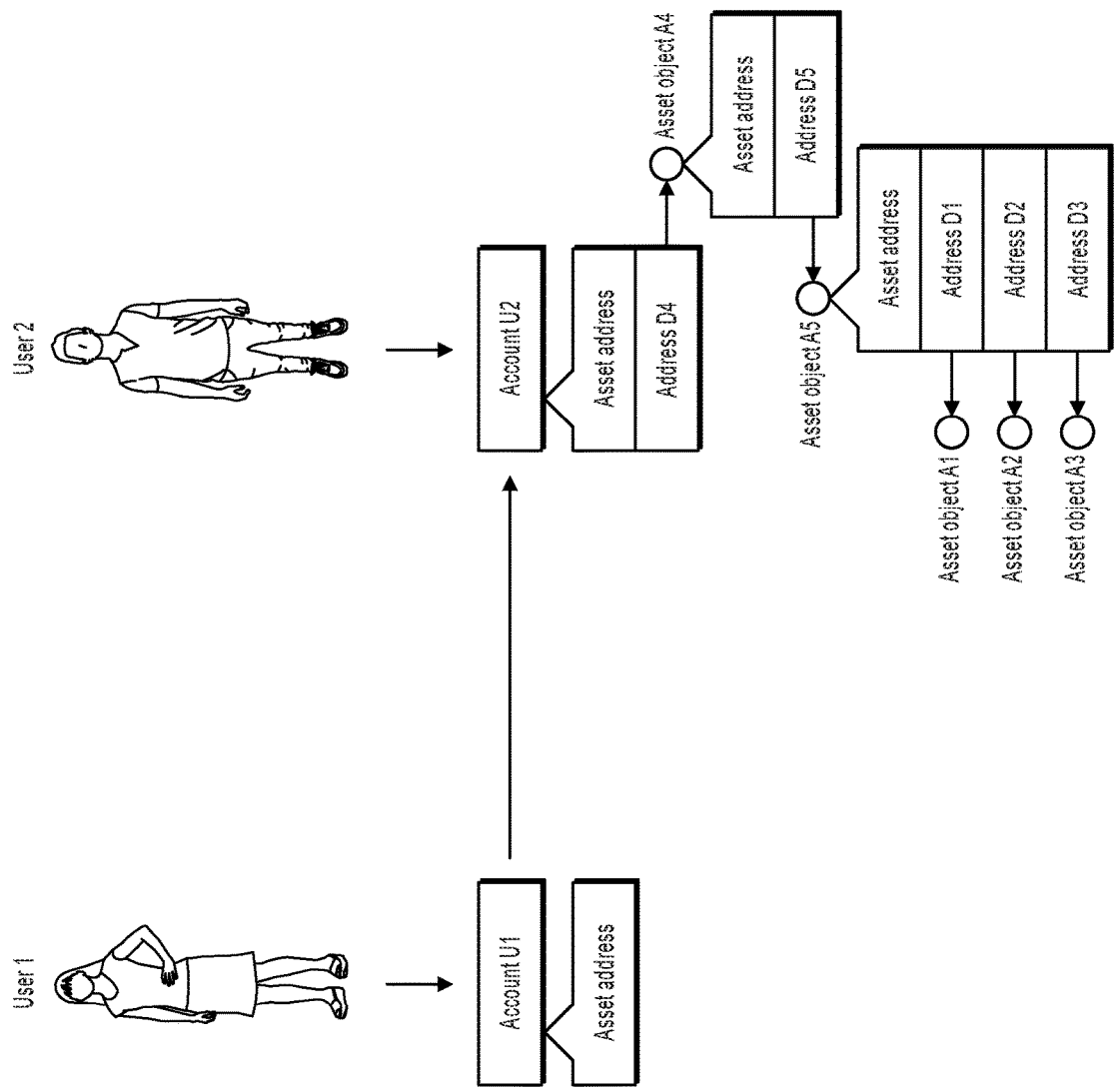
FIG. 11 is another schematic diagram illustrating transferred asset objects, according to a third example implementation.

For another example, similar to the implementations shown in FIG. 5 and FIG. 8, FIG. 11 is another schematic diagram illustrating transferred asset objects, according to a third example implementation. As shown in FIG. 11, an asset object transfer instruction is initiated for asset object A5, address D5 can be deleted from an asset address field of account U1, and address D5 is added to an asset address field of asset object A4. Because ownership of asset object A4 belongs to account U2, ownership of asset object A5 is transferred from account U1 to account U2. In this case, because ownership of asset objects A1 to A3 belongs to asset object A5, the ownership of asset objects A1 to A3 indirectly belongs to account U2, and the ownership of asset objects A1 to A3 is automatically transferred based on an association relationship between asset object A5 and asset objects A1 to A3 without separately initiating the corresponding asset object transfer instruction for asset objects A1 to A3.

In the implementation shown in FIG. 3, asset object A1 has the highest level, and asset objects A2 and A3 have the same relatively lower level. Similarly, in the implementation shown in FIG. 9, asset object A5 has the highest level, and asset objects A1 to A3 have the same relatively lower level. In the implementation shown in FIG. 6, levels of asset object A1, asset object A2, and asset object A3 are in descending order. In some scenarios, when there are more asset objects involved, a created association relationship between the asset objects can include one or more cases in the previous implementation. For example, when there are asset objects B1 to B4, levels of asset object B1, asset object B2, asset object B3 can be in descending order, and asset object B2 and asset object B4 have the same level.

Figure 12:
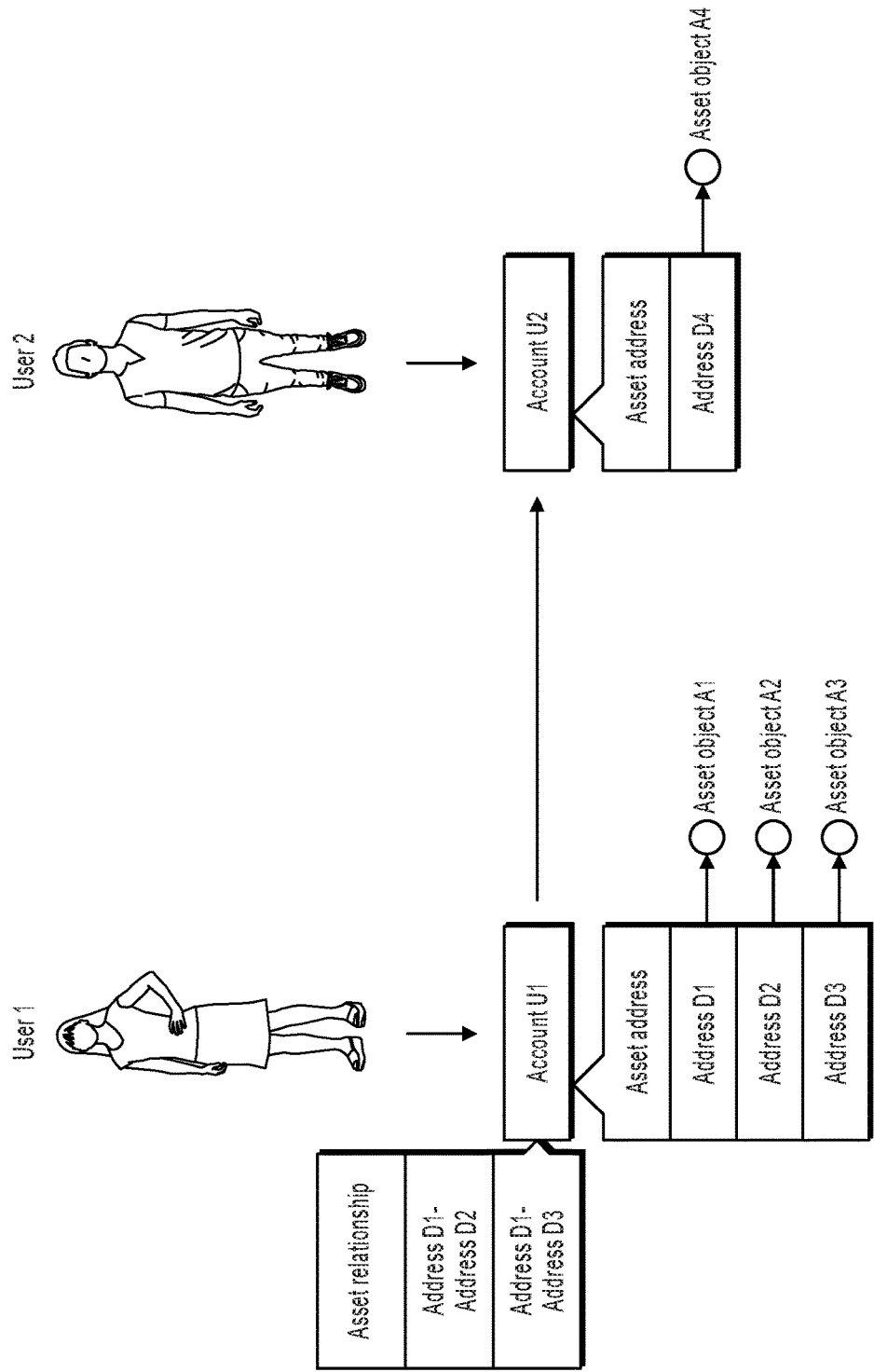
FIG. 12 is a schematic diagram illustrating implementing asset transfer, according to an example implementation.

In the previous implementations shown in FIG. 3 to FIG. 11, address information of a child asset object is written to an asset address field of a parent asset object, to create an association relationship between various asset objects. In other implementations, an association relationship between asset objects can be created in other ways. Implementations are not limited in the present specification. For example, FIG. 12 is a schematic diagram illustrating implementing asset transfer, according to an example implementation. As shown in FIG. 12, addresses D1 to D3 corresponding to asset objects A1 to A3 are written to an asset address field of account U1. It indicates that ownership of asset objects A1 to A3 belongs to account U1. An association relationship between asset objects A1 to A3 can be recorded in an asset relationship field (for example, the asset relationship field can be included in the previous information storage field or another field) corresponding to account U1. For example, the association relationship can be "address D1-address D2" and "address D1-address D3". It indicates that asset objects A2 and A3 are configured as child asset objects belonging to asset object A1. The association relationship corresponds to the association relationship in the implementation shown in FIG. 3.

Figure 13:
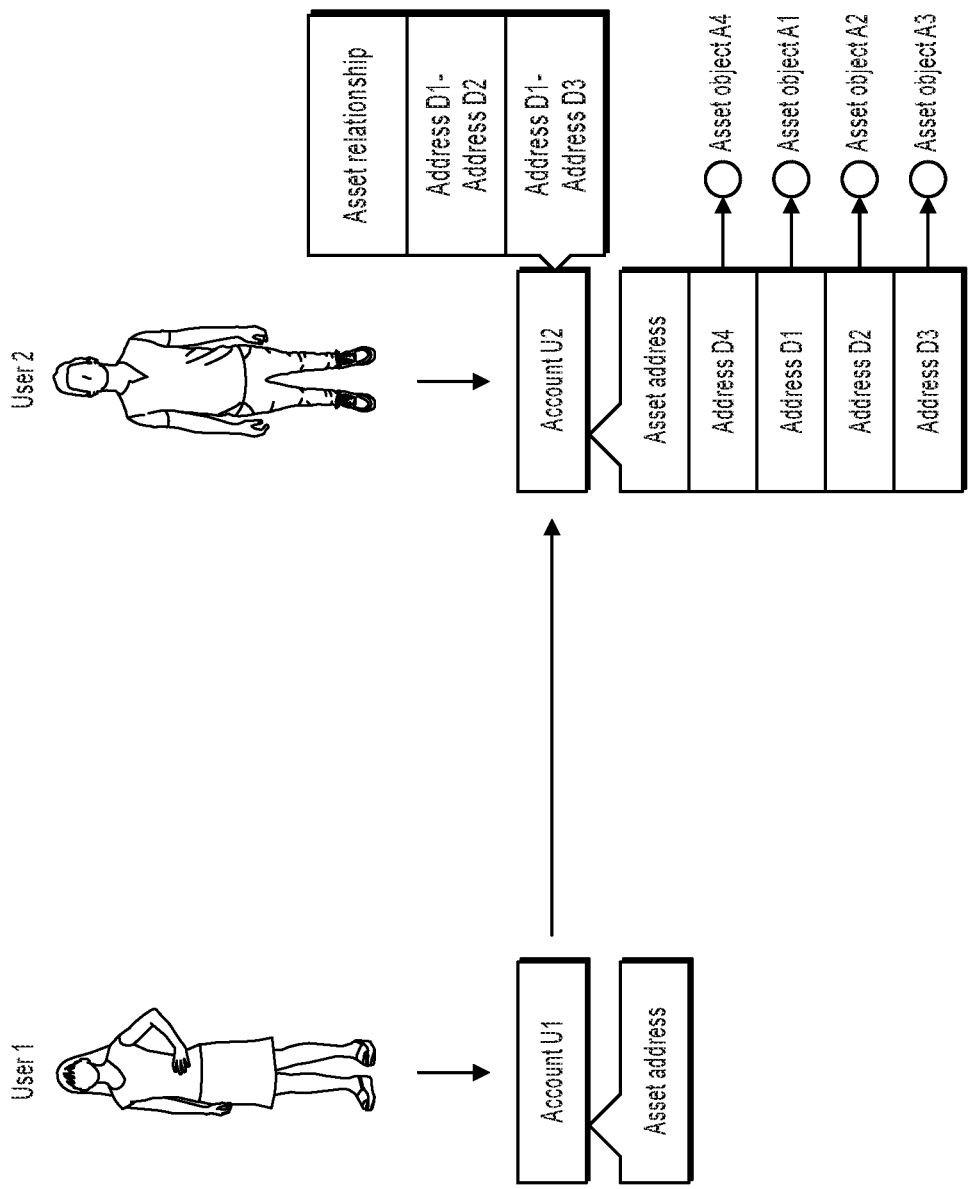
FIG. 13 is a schematic diagram illustrating transferred asset objects, according to an example implementation.

FIG. 13 is a schematic diagram illustrating transferred asset objects, according to an example implementation. As shown in FIG. 13, an asset object transfer instruction is initiated for asset object A1, address D1 can be deleted from an asset address field of account U1, and address D1 is added to an asset address field of account U2, to transfer ownership of asset object A1 from account U1 to account U2. In this case, asset object A2 and asset object A3 are automatically configured as operation targets of the asset object transfer instruction based on an association relationship "address D1-address D2" and "address D1-address D3" recorded in an asset relationship field of account U1, so that address D2 is deleted from the asset address field of account U1, address D2 is added to the asset address field of account U2, address D3 is deleted from the asset address field of account U1, and address D3 is added to the asset address field of account U2. Therefore, ownership of asset objects A2 and A3 is automatically transferred based on the association relationship between asset objects A1 to A3 without separately initiating the corresponding asset object transfer instruction for asset objects A2 and A3.

In addition to transferring asset objects A1 to A3 from account U1 to account U2, the association relationship between asset objects A1 to A3 can also be transferred from the asset relationship field of account U1 to an asset relationship field of account U2, so that a quick asset object transfer operation can be subsequently implemented based on the association relationship. In some implementation, the previous asset relationship can be configured as a fixed attribute that cannot be modified between asset objects, or can be adjusted based on an actual situation, and this depends on a used specified logic.

In some implementation, in addition to transferring address D1 of asset object A1 to the asset address field of account U2, address D1 can also be transferred to an asset address field of asset object A4, so that the ownership of asset object A1 is transferred from account U1 to asset object A4. In this case, the ownership of asset objects A2 and A3 can also be transferred from account U1 to asset object A4 based on the association relationship between asset object A1 and asset objects A2 and A3. Similarly, the association relationship between asset objects A1 to A3 can be transferred from the asset relationship field of account U1 to an asset relationship field of asset object A4.

Figure 14:
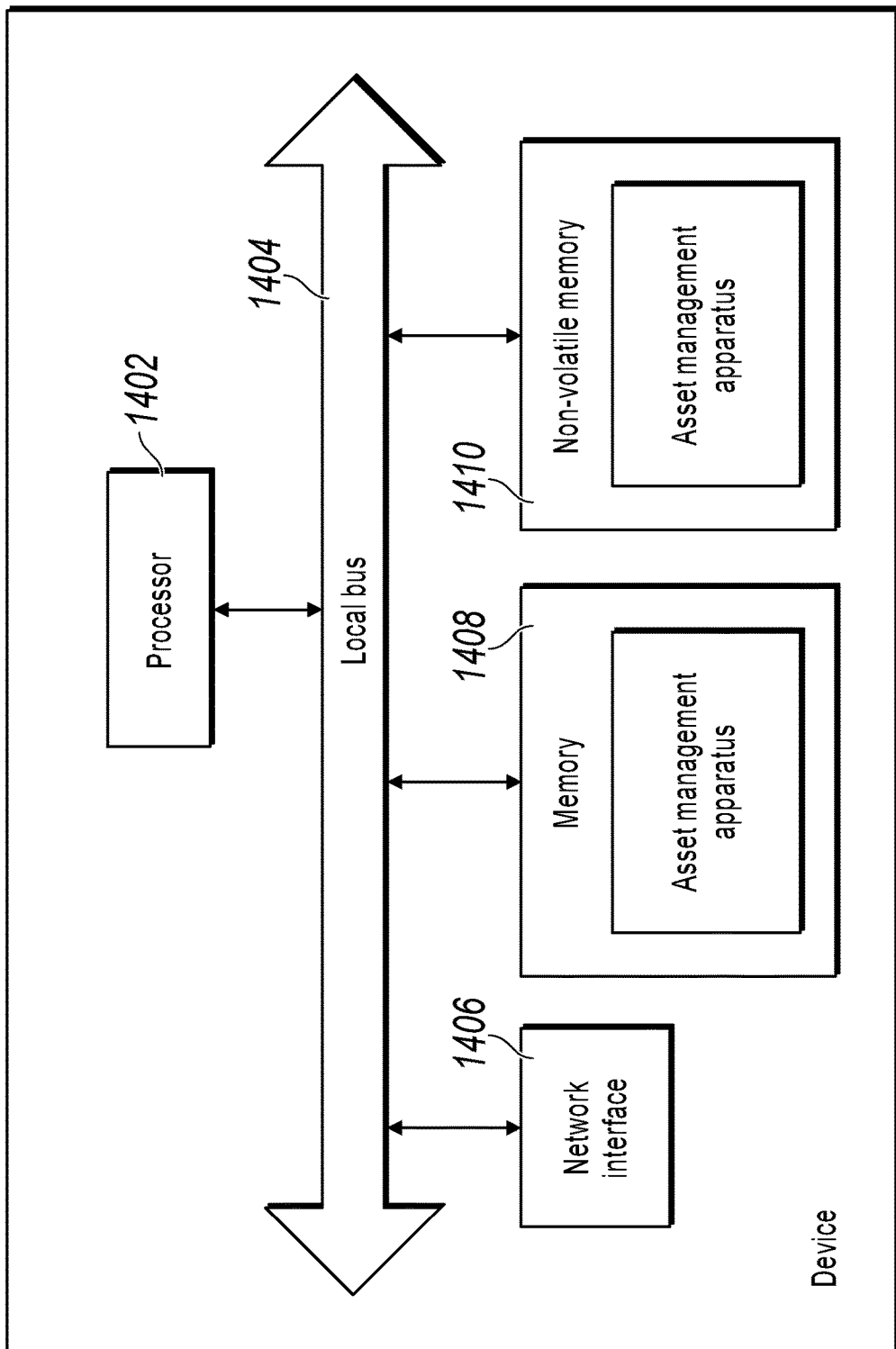
FIG. 14 is a schematic structural diagram illustrating a device, according to an example implementation.

FIG. 14 is a schematic structural diagram illustrating a device, according to an example implementation. Referring to FIG. 14, in terms of hardware, the device includes a processor 1402, a local bus 1404, a network interface 1406, a memory 1408, and a non-volatile memory 1410. In some implementation, the device may further include hardware needed by other services. The processor 1402 reads a corresponding computer program from the non-volatile memory 1410 to the memory 1408 for running, and an asset management apparatus is logically formed. In some implementation, in addition to a software implementation, one or more implementations of the present specification do not exclude other implementations, for example, a logic device or a combination of hardware and software. In other words, an execution body of the following processing procedure is not limited to various logical units, and can also be hardware or a logic device.

Figure 15:
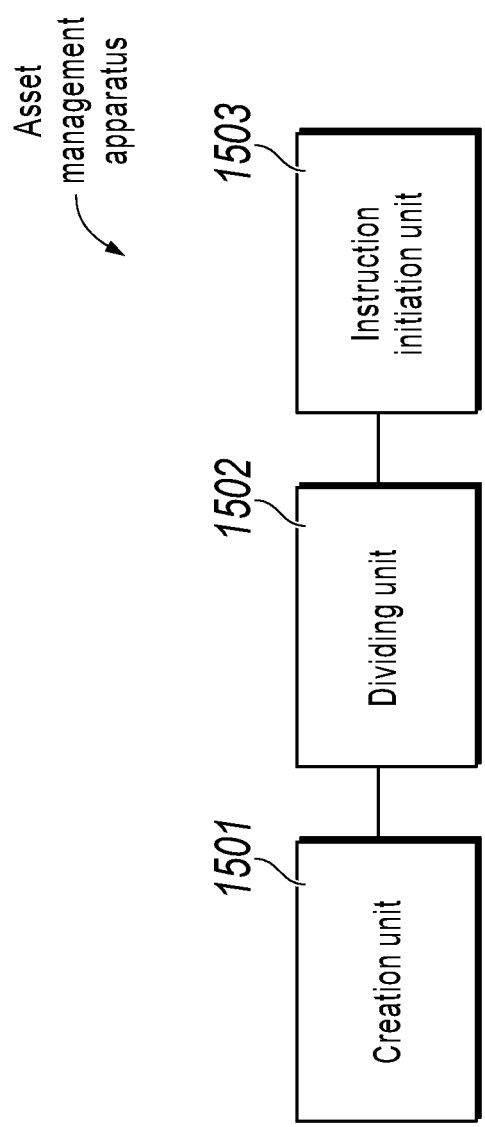
FIG. 15 is a block diagram illustrating an asset management apparatus, according to an example implementation.

Referring to FIG. 15, in a software implementation, the asset management apparatus can include: a creation unit 1501, configured to enable a blockchain node in a blockchain network to create an asset container, to record field information of an asset object registered on a blockchain ledger; and a dividing unit 1502, configured to enable the blockchain node to divide corresponding asset containers into at least one asset container group based on an association relationship between asset objects, where an association relationship exists between each asset container in the asset container group and at least one another asset container in the asset container group.

Optionally, the asset management apparatus further includes: an instruction initiation unit 1503, configured to enable the blockchain node to initiate an operation instruction for the first asset container in the asset container group.

When there is the second asset container associated with the first asset container in the asset container group, both the first asset container and the second asset container are added as operation targets of the operation instruction.

Optionally, the asset management apparatus further includes: an instruction initiation unit 1503, configured to enable the blockchain node to initiate an operation instruction for the first asset container in the asset container group.

After the operation instruction is executed for the first asset container, the second asset container and the first asset container keep an original association relationship.

Optionally, the instruction initiation unit is specifically configured to enable the blockchain node to initiate a contract operation for the first asset container.

Optionally, the operation instruction includes at least one of an asset object transfer instruction and an asset object transaction instruction.

Optionally, the second asset container includes all direct descendant asset containers of the first asset container in the asset container group.

Optionally, the association relationship includes a homing relationship of a hierarchical structure.

Optionally, each parent asset container has one or more child asset containers, and each child asset container belongs to only one parent asset container.

Optionally, when the second asset container is an asset container associated with the first asset container in the asset container group, indication information of the second asset container is recorded in the first asset container.

Optionally, the indication information includes an address of the second asset container.

Optionally, the indication information is added to a predetermined field of an asset object recorded in the first asset container.

The system, apparatuses, modules, or units illustrated in the previous implementations can be implemented by using a computer chip or an entity, or can be implemented by using a product having a particular function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

In a typical configuration, a computer includes one or more processors (CPU), an input/output interface, a network interface, and a memory.

The memory may include a non-persistent memory, a random access memory (RAM), and/or a non-volatile memory in a computer readable medium, for example, a read-only memory (ROM) or a flash memory (flash RAM). The memory is an example of the computer readable medium.

The computer readable medium includes persistent, non-persistent, movable, and unmovable media that can implement information storage by using any method or technology. Information can be a computer readable instruction, a data structure, a program module, or other data. A computer storage medium includes but is not limited to a phase-change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a magnetic tape, a magnetic disk storage, a quantum memory, a graphene storage medium or another magnetic storage device or any other non-transmission medium. The computer storage medium can be used to store information that can be accessed by a computing device. Based on the definition in the present specification, the computer readable medium does not include transitory computer-readable media (transitory media), for example, a modulated data signal and carrier.

It is worthwhile to further note that the terms "include", "comprise", or their any other variant is intended to cover a non-exclusive inclusion, so that a process, a method, a product, or a device that includes a list of elements not only includes those elements but also includes other elements which are not expressly listed, or further includes elements inherent to such a process, a method, a product, or a device. An element preceded by "includes a . . . " does not, without more constraints, preclude the existence of additional identical elements in the process, method, product, or device that includes the element.

Specific implementations of the present specification are described above. Other implementations fall within the scope of the appended claims. In some cases, the actions or steps described in the claims can be performed in an order different from the order in the implementation and the desired results can still be achieved. In addition, the process provided in the accompanying drawings does not necessarily require a particular execution order to achieve the desired results. In some implementations, multi-tasking and parallel processing can be advantageous.

The terms used in the one or more implementations of the present specification are merely for illustrating specific implementations, and are not intended to limit the one or more implementations of the present specification. The terms "a", "said", and "the" of singular forms used in the one or more implementations of the present specification and the appended claims are also intended to include plural forms, unless otherwise specified in the context clearly. It should also be understood that the term "and/or" used in the present specification indicates and includes any or all possible combinations of one or more associated listed items.

It should be understood that although terms "first", "second", "third", etc. may be used in the one or more implementations of the present specification to describe various types of information, the information is not limited to the terms. These terms are used to differentiate information of the same type. For example, without departing from the scope of the one or more implementations of the present specification, the first information can also be referred to as the second information, and similarly, the second information can also be referred to as the first information. Depending on the context, for example, the word "if" used here can be explained as "while", "when", or "in response to determining".

The previous descriptions are example implementations of the one or more implementations of the present specification, but are not intended to limit the one or more implementations of the present specification. Any modification, equivalent replacement, improvement, etc. made without departing from the spirit and principle of the one or more implementations of the present specification shall fall within the protection scope of the one or more implementations of the present specification.

Figure 16:
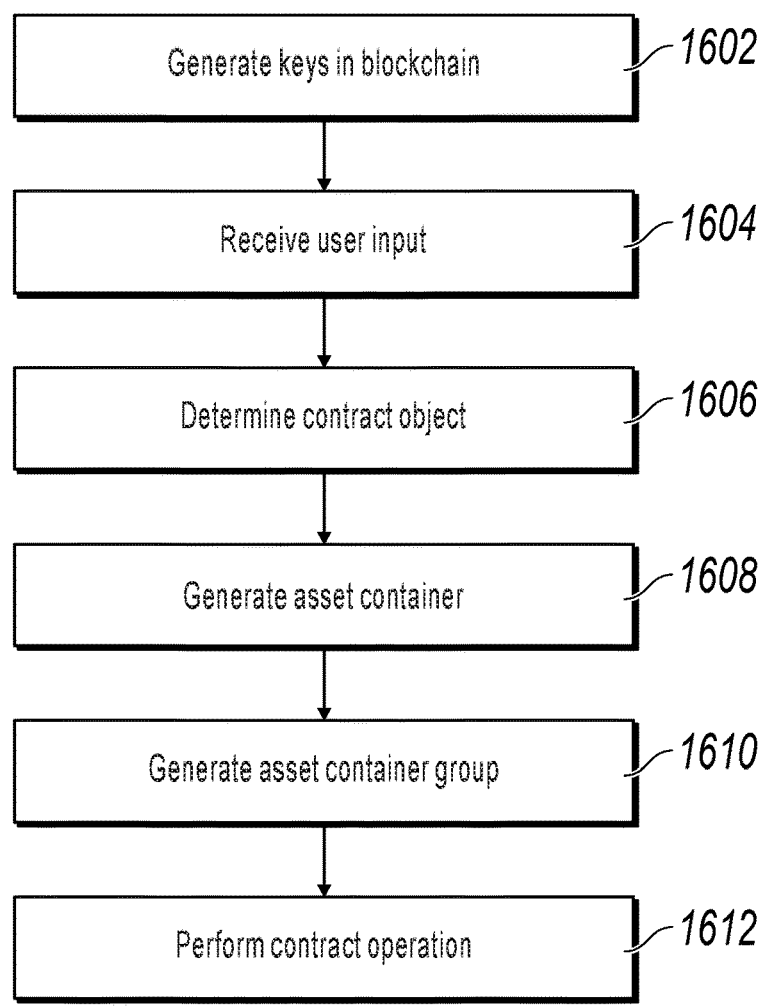
FIG. 16 is a flowchart illustrating an example of a computer-implemented method for asset management, according to an implementation of the present disclosure.

FIG. 16 is a flowchart illustrating an example of a computer-implemented method 1600 for management of assets in a blockchain, according to an implementation of the present disclosure. For clarity of presentation, the description that follows generally describes method 1600 in the context of the other figures in this description. However, it will be understood that method 1600 can be performed, for example, by any system, environment, software, and hardware, or a combination of systems, environments, software, and hardware, as appropriate. In some implementations, various steps of method 1600 can be run in parallel, in combination, in loops, or in any order.

At 1602, keys are generated for a target user recorded in a distributed database of the blockchain network. The keys include a public key and a private key. In some implementations, the public key is associated with an account address of an institution in the blockchain. The private key can be configured to be used by the institution to operate the account. In some implementations, the blockchain network includes a consortium chain, and the target member (user) in the blockchain network is a consortium member that has asset object generation authority in the consortium chain. The blockchain network includes one or more account objects and one or more contract objects. The objects of the blockchain network (e.g., account objects, contract objects, target objects, and asset objects) include one or more fields. For example, the fields can include one or more of the following: the IP configuration for the target user; DNS logs from the target user, including events such as DNS lookups, changes to DNS settings, and so forth; network firewall logs (and/or other security-related log files) from the target user, including events such as blocked or allowed network communications, and so forth; operating system (OS) logs from the target user, including events associated with the OS; port settings on the target user; user access logs from the target user, including successful and/or unsuccessful user attempts to transfer assets from or to the target user; and/or user privilege data from the target user, including particular access privileges for various users on the target user. The fields can also include one or more of an entity name, entity ID, target user ID, OS version information, and software version(s) for installed software, network router information, other DNS settings, firewall settings, port settings, IP whitelist and/or blacklist settings, and so forth. From 1602, method 1600 proceeds to 1604.

At 1604, a user input is received from the target user. The user input includes a request to perform a contract operation on asset objects. The asset objects include digital assets corresponding to physical assets associated with the target user. From 1604, method 1600 proceeds to 1606.

At 1606, a contract object corresponding to the asset objects is determined through a selection of contract objects from the blockchain network. The contract object can include an execution program configured to generate the target object and a code field that is used to maintain an execution code related to the execution program. The contract object can include an operation instruction used to perform the contract operation on the asset container group, maintaining association relationships of the asset container group. The contract object can include a code field that is used to maintain an execution code related to the execution program. From 1606, method 1600 proceeds to 1608.

At 1608, in response to receiving the request, an asset container is generated based on the asset objects. The asset container can be generated to serve as an operation target of the contract operation. The asset container can record field information of the asset objects. The asset container can include a data table of a predetermined structure. In some implementations, the asset container is a parent asset container that has one or more child asset containers, and each child asset container belongs to only one parent asset container. For example, a second asset container can be generated in response to generating the asset container. The second asset container can be a direct descendant asset container of the first asset container. From 1608, method 1600 proceeds to 1610.

At 1610, an asset container group is generated by dividing the asset container based on an association relationship between the asset objects within the asset container. The association relationship can define correspondences between each asset container in the asset container group and at least one other asset container in the asset container group. The association relationship can include a homing relationship of a hierarchical structure. From 1610, method 1600 proceeds to 1612.

At 1612, a contract operation is performed using the contract object. For example, the contract object performs the contract operation by executing the operation instruction. The operation instruction can include a transfer instruction or a transaction instruction for at least one of the asset objects. In some implementations, the contract operation includes updating a target object associated with the asset objects. The target object includes an address field used to maintain address information of the plurality of asset objects by deploying a contract object corresponding to the asset type in the blockchain to create the target object. After 1612, method 1600 stops.

Implementations of the present application can solve technical problems in managing assets in a blockchain. In some implementations, the blockchain is a distributed storage solution that provides immutable and tamper-resistant data transfer and storage, and the data is stored in a database of the blockchain in an encrypted form. Such security measures ensure that that system state data stored on the blockchain is not corrupted or altered by malicious processes. For example, an alteration of an asset-receiving object can be a tactic used by an attacker when a target user is compromised for fraudulent purposes, and storage of system state data on an immutable blockchain prevents the use of that tactic by an attacker. In some implementations, the blockchain headers from different payment applications across entities are cross-Merkelized or otherwise processed on the blockchain to further ensure the integrity of the data stored in the database of the blockchain.

In consideration of security and confidentiality, contract objects can be configured to perform privacy protection processing on the data associated with the asset object before generating the asset object and sending the address information to other platforms for processing. In addition, the asset transfer operation is configured such that it does not affect the overall data volume within the blockchain by deleting a data volume from a first location when adding the corresponding data volume in a second location. As such, the asset transfer operation does not lead to an exponential increase of data volume, which is a common problem associated with conventional methods of asset management.

Implementations of the present application provide methods and apparatuses for improving asset management. In some implementations, a processing platform (e.g., a payment processing server) obtains data that is to be validated and that corresponds to a predetermined feature from a data providing platform as a data group that is to be validated (e.g., a data group that corresponds to user transaction amounts). In addition, the processing platform can further obtain additional (e.g., historical) data associated with the asset that is to be validated by the predetermined transfer rule. The historical data may also correspond to the same predetermined feature, and the comparison data group can be provided to a processing platform (e.g., a node of the blockchain network) for processing before the asset transfer. Then, the processing platform determines whether the asset transfer request satisfies the predetermined transfer rule. If the predetermined transfer rule is satisfied (e.g., there is no abnormal data), the processing platform can continue to transfer the asset. If the processing platform determines that there is abnormal data, the processing platform can start alerting, instruct related persons to analyze the cause of the data exception, and trigger related solutions.

In some implementations, the processing platform determines risk scores of asset transfers and transactions across multiple different entities, based on both transaction data for the transaction and system state data for the hosts involved in handling the transaction. The risk scores are examined to identify those transactions that are deemed high risk, with above-threshold scores. Such transactions can be blocked or queued for further examination in a case management system, for example. The system state data to be used for comparison, as well as the transaction data and risk score(s), can be stored on the blockchain that provides immutable, secure, and distributed data storage. Use of the blockchain facilitates the collection and analysis of a large amount of transaction data and system state data, which may grow over time as transaction traffic increases and/or transaction networks expand by adding more hosts to accommodate the increased traffic. Accordingly, through the use of a blockchain to store and analyze the data, implementations provide scalability with respect to the data extraction, analysis, and storage of the data. Moreover, because the blockchain is distributed across multiple network locations, implementations avoid the use of a centralized database for data storage and are therefore less vulnerable to corruption or deletion by malicious processes, in comparison to traditional, previously available risk analysis solutions that are vulnerable to attack at such a centralized storage hub.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for asset management, the computer-implemented method comprising:
    receiving, from a target user recorded in a distributed database of a blockchain network, a user input comprising a request to perform a contract operation on asset objects comprising digital assets corresponding to physical assets associated with the target user, wherein the asset objects are registered in the distributed database, and wherein each asset object corresponds to a respective asset container recording field information of the asset object;
    grouping a plurality of asset containers into an asset container group based on association relationships among the asset objects corresponding to the plurality of asset containers in the asset container group, wherein the association relationships define correspondences between each asset container in the asset container group and at least one other asset container in the asset container group; and
    performing the contract operation on the asset container group using a contract object.

2. The computer-implemented method of claim 1, wherein the contract object comprises a declaration of an execution program and an operation instruction used to perform the contract operation on the asset container group, maintaining the association relationships among the asset objects corresponding to the plurality of asset containers in the asset container group.

3. The computer-implemented method of claim 2, wherein the contract object comprises a code field that is used to maintain an execution code related to the execution program.

4. The computer-implemented method of claim 2, wherein the operation instruction comprises at least one of a transfer instruction and a transaction instruction for at least one of the asset objects.

5. The computer-implemented method of claim 1, wherein the association relationships comprise a homing relationship of a hierarchical structure.

6. The computer-implemented method of claim 1, wherein the asset container comprises a data table of a predetermined structure.

7. The computer-implemented method of claim 1, wherein the blockchain network comprises a consortium chain, and the target user in the blockchain network is a consortium member that has asset object generation authority in the consortium chain.

8. A non-transitory, computer-readable medium storing one or more instructions executable by a computer system to perform operations comprising:
    receiving, from a target user recorded in a distributed database of a blockchain network, a user input comprising a request to perform a contract operation on asset objects comprising digital assets corresponding to physical assets associated with the target user, wherein the asset objects are registered in the distributed database, and wherein each asset object corresponds to a respective asset container recording field information of the asset object;
    grouping a plurality of asset containers into an asset container group based on association relationships among the asset objects corresponding to the plurality of asset containers in the asset container group, wherein the association relationships define correspondences between each asset container in the asset container group and at least one other asset container in the asset container group; and
    performing the contract operation on the asset container group using a contract object.

9. The non-transitory, computer-readable medium of claim 8, wherein the contract object comprises a declaration of an execution program and an operation instruction used to perform the contract operation on the asset container group, maintaining the association relationships among the asset objects corresponding to the plurality of asset containers in the asset container group.

10. The non-transitory, computer-readable medium of claim 9, wherein the contract object comprises a code field that is used to maintain an execution code related to the execution program.

11. The non-transitory, computer-readable medium of claim 9, wherein the operation instruction comprises at least one of a transfer instruction and a transaction instruction for at least one of the asset objects.

12. The non-transitory, computer-readable medium of claim 8, wherein the association relationships comprise a homing relationship of a hierarchical structure.

13. The non-transitory, computer-readable medium of claim 8, wherein the asset container comprises a data table of a predetermined structure.

14. The non-transitory, computer-readable medium of claim 8, wherein the blockchain network comprises a consortium chain, and the target user in the blockchain network is a consortium member that has asset object generation authority in the consortium chain.

15. A computer-implemented system, comprising:
    one or more computers; and
    one or more computer memory devices interoperably coupled with the one or more computers and having tangible, non-transitory, machine-readable media storing one or more instructions that, when executed by the one or more computers, perform operations comprising:
        receiving, from a target user recorded in a distributed database of a blockchain network, a user input comprising a request to perform a contract operation on asset objects comprising digital assets corresponding to physical assets associated with the target user, wherein the asset objects are registered in the distributed database, and wherein each asset object corresponds to a respective asset container recording field information of the asset object;

grouping a plurality of asset containers into an asset container group based on association relationships among the asset objects corresponding to the plurality of asset containers in the asset container group, wherein the association relationships define correspondences between each asset container in the asset container group and at least one other asset container in the asset container group; and performing the contract operation on the asset container group using a contract object.

16. The computer-implemented system of claim 15, wherein the contract object comprises a declaration of an execution program and an operation instruction used to perform the contract operation on the asset container group, maintaining the association relationships among the asset objects corresponding to the plurality of asset containers in the asset container group.

17. The computer-implemented system of claim 16, wherein the contract object comprises a code field that is used to maintain an execution code related to the execution program.

18. The computer-implemented system of claim 16, wherein the operation instruction comprises at least one of a transfer instruction and a transaction instruction for at least one of the asset objects.

19. The computer-implemented system of claim 15, wherein the association relationships comprise a homing relationship of a hierarchical structure.

20. The computer-implemented system of claim 15, wherein the asset container comprises a data table of a predetermined structure.

* * * * *